United States Patent
Nyhuis

(10) Patent No.: US 12,549,524 B2
(45) Date of Patent: *Feb. 10, 2026

(54) SECURE TRANSLATOR FOR INSECURE COMPUTING DEVICE

(71) Applicant: Vigilant IP Holdings LLC, West Chester, OH (US)

(72) Inventor: Christopher M. Nyhuis, Liberty Township, OH (US)

(73) Assignee: Vigilant IP Holdings LLC, West Chester, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/990,450

(22) Filed: Dec. 20, 2024

(65) Prior Publication Data

US 2025/0133065 A1    Apr. 24, 2025

Related U.S. Application Data

(63) Continuation of application No. 17/799,764, filed as application No. PCT/US2021/018072 on Feb. 14, 2021, now Pat. No. 12,177,190.

(60) Provisional application No. 62/976,381, filed on Feb. 14, 2020.

(51) Int. Cl.
*H04L 9/40* (2022.01)

(52) U.S. Cl.
CPC .......... *H04L 63/04* (2013.01); *H04L 63/0281* (2013.01); *H04L 63/20* (2013.01)

(58) Field of Classification Search
CPC ..... H04L 63/04; H04L 63/0281; H04L 63/20; H04L 67/565; H04L 67/535
See application file for complete search history.

(56) References Cited

U.S. PATENT DOCUMENTS

| | | | |
|---|---|---|---|
| 2006/0062206 A1* | 3/2006 | Krishnaswamy | H04L 63/0272 370/465 |
| 2013/0260672 A1* | 10/2013 | Patil | H04M 1/72412 455/39 |
| 2020/0220863 A1* | 7/2020 | Athlur | H04L 9/3226 |
| 2021/0194888 A1* | 6/2021 | Bhaskar S | G06F 16/3347 |

* cited by examiner

*Primary Examiner* — Sm A Rahman
(74) *Attorney, Agent, or Firm* — FBT Gibbons LLP

(57) ABSTRACT

A secure translator is described herein for use with an insecure device. An insecure device is a computing device that either does not have the ability to or can no longer communicate at desired security levels. The secure translator is configured to act as a proxy for insecure devices, allowing for full translation of any inbound communication to be secured, with information scrubbed or otherwise manipulated, then translated over a direct connection to the insecure device.

20 Claims, 4 Drawing Sheets

SECURE TRANSLATOR FOR INSECURE COMPUTING DEVICE

REFERENCE TO RELATED APPLICATIONS

This application is a continuation of and claims priority to U.S. Non-Provisional patent application Ser. No. 17/799,764, entitled "Secure Translator for Insecure Computing Device," filed on Aug. 15, 2022, which claims the benefit of PCT/US2021/18072, entitled "Secure Translator for Insecure Computing Device," filed on Feb. 14, 2021, and U.S. Provisional Pat. App. No. 62/976,381, entitled "Secure Translator for Insecure Computing Device," filed on Feb. 14, 2020, the disclosures of which are incorporated by reference herein.

BACKGROUND

Security of connected devices is an ever-changing field, and the lifecycles of many connected devices exceed the longevity of their initial expected security posture and even the useful lifetime of the security standards to which they were designed. What is needed, then, is a way to minimize any adverse security impact of using devices that have outlived their security.

BRIEF DESCRIPTION OF THE DRAWINGS

While the specification concludes with claims that particularly point out and distinctly claim the invention, it is believed the present invention will be better understood from the following description of certain examples taken in conjunction with the accompanying drawings, in which like reference numerals identify the same elements and in which:

Figure 1:
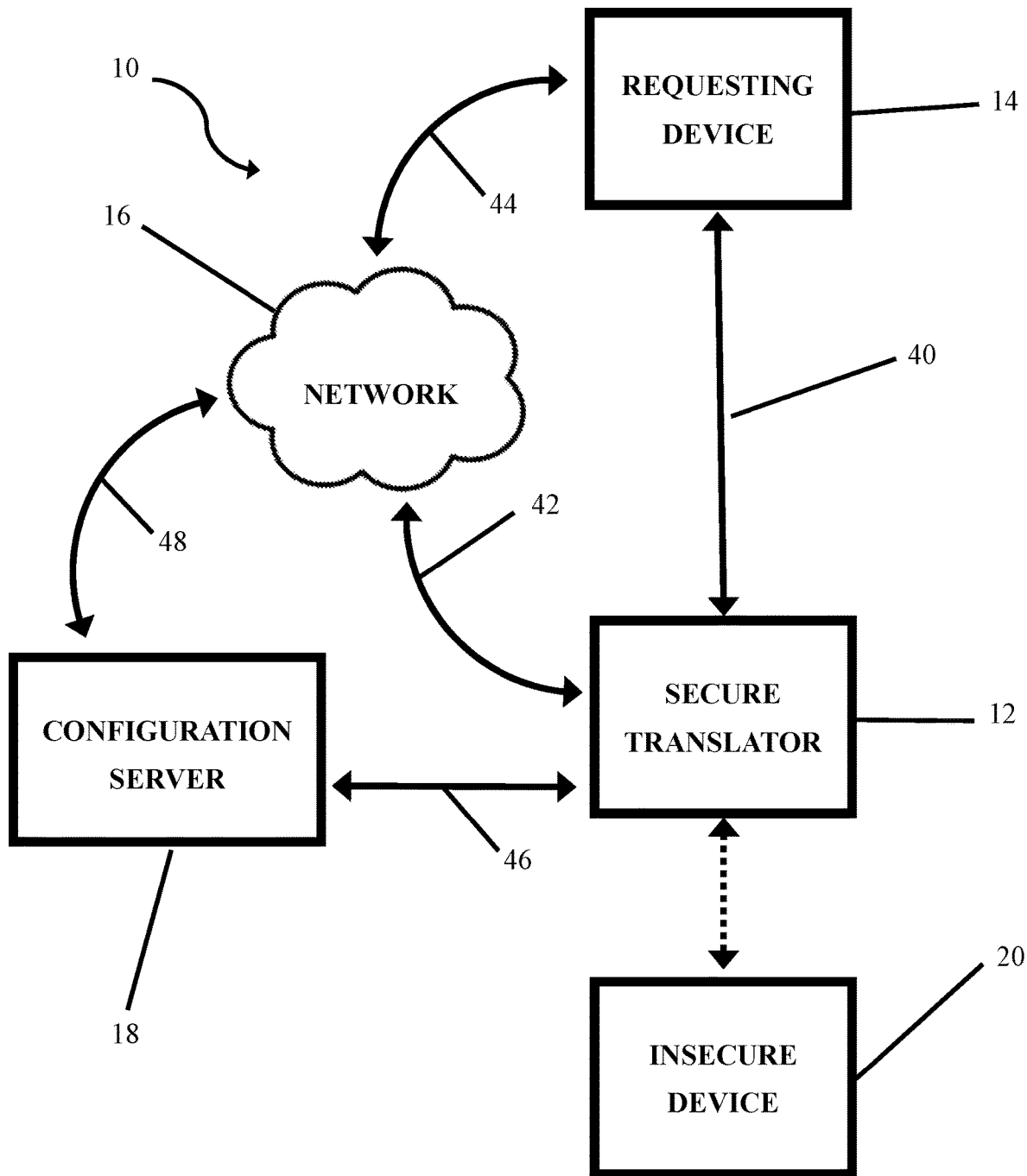
FIG. 1 depicts a schematic diagram of an exemplary operating environment of an exemplary secure translator.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

It will be appreciated that any one or more of the teachings, expressions, versions, examples, etc. described herein may be combined with any one or more of the other teachings, expressions, versions, examples, etc. that are described herein. The following-described teachings, expressions, versions, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

I. Operating Environment

Referring to FIG. 1, an operating environment (10) in accordance with some versions of the invention may include a secure translator (12), a requesting device (14), a network (16), a configuration server (18), and an insecure device (20). In general, insecure device (20) is a computing device that either does not have the ability to, or no longer can, communicate via a network at the security levels preferred or required by the industry or underlying environment. For example, insecure device (20) in many embodiments is an "Internet of things" (IoT) device capable of detecting and/or capturing information about its environment and communicating that information (or a processed version thereof) to other computing resources, such as servers, via the Internet. Conventionally, insecure computing devices such as insecure device (20) are removed entirely from the underlying environment and replaced with a new, more secure computing device programmed with the latest security protocols, software patches, and technology. The replacement of insecure computing devices represents significant financial and labor costs to the owner/administrator of the insecure computing device. To that end, secure translator (12) may extend the life of computing devices such as insecure device (20) long beyond the level of compliance for which it was designed.

Secure translator (12) is a computing device that acts in some ways as a proxy for communication between insecure device (20) and other devices, such as requesting device (14). In various embodiments, secure translator (12) captures, analyzes, sanitizes, manipulates, and/or translates inbound secure communications intended for insecure device (20) into communication utilized by insecure device (20) such that a secure device can communicate securely with insecure device (20). Conversely, secure translator (12) captures, analyzes, sanitizes, manipulates, and/or translates outbound insecure communications from insecure device (20) into secure communications and passes the secured communication on to the intended destination. In this way, older, legacy computing devices that are out of security compliance or otherwise incapable of communicating via the current industry and/or regulatory standards for secure communications may continue to be used without jeopardizing the safety of the underlying network, the communications, or the computing device itself.

Secure translator (12) is configured in this illustrated embodiment to communicate bidirectionally with requesting device (14). The bidirectional communication may take the form of direct communication (40) between secure translator (12) and requesting device (14). Alternatively, the bidirectional communication between secure translator (12) and requesting device (14) may take the form of indirect communication, whereby communication (42, 44) between secure translator (12) and requesting device (14) passes through one or more other devices represented as network (16). Network (16) may include one or more private or public networks (e.g., the Internet) that enable the exchange of data.

Similarly, secure translator (12) is configured in this illustrated embodiment to communicate bidirectionally with configuration server (18) for receiving configuration files or information, or for remote configuration of secure translator (12). The bidirectional communication between secure translator (12) and configuration server (18) may take the form of direct communication (46) between secure translator (12) and configuration server (18) or indirect communication, whereby communication (42, 48) between secure translator (12) and requesting device (18) passes through network (16).

Secure translator (12) is also configured in this illustrated embodiment to communicate bidirectionally with an insecure device (20). The bidirectional communication between secure translator (12) and insecure device (20) is direct, private communication only, preferably configured to minimize the likelihood of interception of or tampering with the data being exchanged. In use, insecure device (20) in this illustrated embodiment does not engage in any indirect communication. To that end, in operating environment (10), insecure device (20) is "off network" and does not communicate with or over network (16) except through secure translator (12). The communication connection between secure translator (12) and insecure device (20) may be via ethernet or any other current or future bus, communication technology, or protocol in furtherance of direct, private bidirectional communication between secure translator (12) and insecure device (20).

Figure 2:
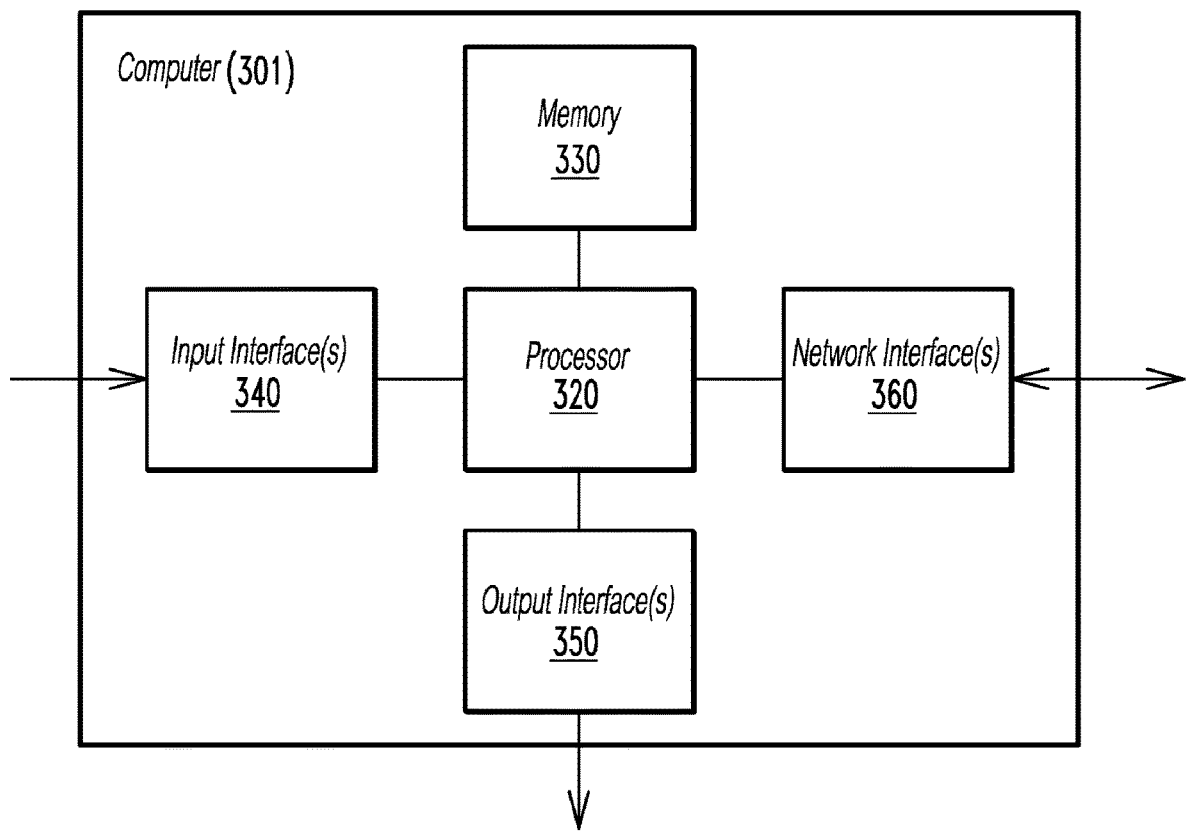
FIG. 2 depicts a schematic diagram of an exemplary computing device used in the operating environment of FIG. 1.

Secure translator (12), requesting device (14), network (16), configuration server (18), and/or insecure device (20) may be implemented on one or more computer devices or systems, such as exemplary computer (301) as shown in FIG. 2 and described in greater detail below.

II. Computing Devices

In some embodiments of the system described herein, the computing resources/devices that are applied generally take the form of a mobile, laptop, desktop, or server-type computer, as mentioned above and as will occur to those skilled in the art. A "computing device" or "computer" (301), as this example will generically be referred to with reference to FIG. 2, includes a processor (320) in communication with a memory (330), input interface(s) (340), output interface(s) (350), and network interface (360). Memory (330) stores a variety of data but is also encoded with programming instructions executable to perform the functions described herein. Power, ground, clock, and other signals and circuitry (not shown) are used as appropriate as will be understood and easily implemented by those skilled in the art.

Network interface (360) connects computer (300) to a data network (370) for communication of data between computer (300) and other devices attached to network (370). Input interface(s) (340) manage communication between processor (320) and one or more touch screens, sensors, pushbuttons, UARTs, IR and/or RF receivers or transceivers, decoders, or other devices, as well as traditional keyboard and mouse devices. Output interface(s) (350) provide a video signal to a display (380), and may provide signals to one or more additional output devices such as LEDs, LCDs, or audio output devices, local multimedia devices, local notification devices, or a combination of these and other output devices and techniques as will occur to those skilled in the art.

Processor (320) in some embodiments is a microcontroller or general-purpose microprocessor that reads its program from memory (330). Processor (320) may be comprised of one or more components configured as a single unit. Alternatively, when of a multi-component form, the processor may have one or more components located remotely relative to the others. One or more components of the processor may be of the electronic variety including digital circuitry, analog circuitry, or both. In some embodiments, the processor is of a conventional, integrated circuit microprocessor arrangement, such as one or more CORE i3, i5, or i7 processors from INTEL Corporation of 2200 Mission College Boulevard, Santa Clara, Calif. 95052, USA, or OPTERON or PHENOM processors from Advanced Micro Devices, One AMD Place, Sunnyvale, Calif. 94088, USA. In alternative embodiments, one or more reduced instruction set computer (RISC) processors, application-specific integrated circuits (ASICs), general-purpose microprocessors, programmable logic arrays, or other devices may be used alone or in combinations as will occur to those skilled in the art.

Likewise, memory (330) in various embodiments includes one or more types such as solid-state electronic memory, magnetic memory, or optical memory, just to name a few. By way of non-limiting example, memory (330) can include solid-state electronic Random Access Memory (RAM), Sequentially Accessible Memory (SAM) (such as the First-In, First-Out (FIFO) variety or the Last-In First-Out (LIFO) variety), Programmable Read-Only Memory (PROM), Electrically Programmable Read-Only Memory (EPROM), or Electrically Erasable Programmable Read-Only Memory (EEPROM); an optical disc memory (such as a recordable, rewritable, or read-only DVD or CD-ROM); a magnetically encoded hard drive, floppy disk, tape, or cartridge medium; a solid-state or hybrid drive; or a plurality and/or combination of these memory types. Also, the memory in various embodiments is volatile, nonvolatile, or a hybrid combination of volatile and nonvolatile varieties.

Computer programs implementing the methods described herein will commonly be stored and/or distributed either on a physical distribution medium, such as CD-ROM, or via a network distribution medium such as an internet protocol or token ring network, using other media, or through some combination of such distribution media. From there, they will often be copied to a hard disk, non-volatile memory, or a similar intermediate storage medium. When the programs are to be run, they are loaded either from their distribution medium or their intermediate storage medium into the execution memory of the computer, configuring the computer to act in accordance with the method described herein. All of these operations are well known to those skilled in the art of computer systems.

III. Operation of Secure Translator

Figure 3:
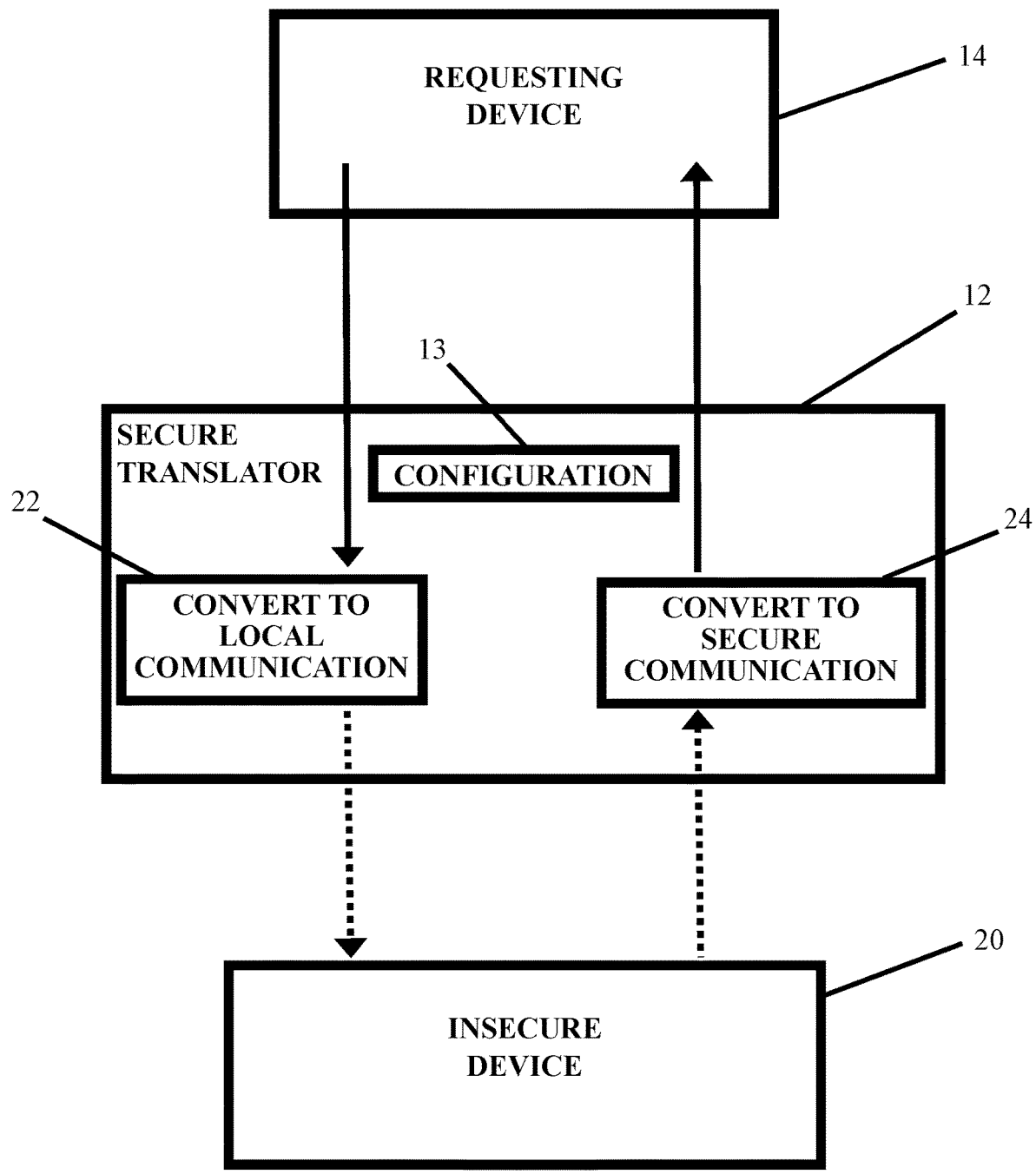
FIG. 3 depicts a schematic diagram of the secure translator of FIG. 1 communicating with an exemplary requesting device and an exemplary insecure device.

With reference to FIG. 3, requesting device (14) communicates with secure translator (12) using either direct or network-switched communications that travel across the data networks in the computing environment, such as a company's data networks. Communication on this side of secure translator (12) uses enforced security requirements in accordance with predetermined industry standards or policies applicable to the computing, business, and/or communication environment.

Insecure device (20) communicates with secure translator (12) using only a direct, private connection. Communication on this side of secure translator (12) is completely off-network (with respect to all other devices) and is preferably not accessible to any other devices in the environmental open network. The direct connection between insecure device (20) and secure translator (12) may be ethernet or bus technology or any other communication technology, including any future connection technology, medium, or technique that one of ordinary skill in the art might use to enable communication between insecure device (20) and secure translator (12).

In the illustrated embodiment, secure translator (12) starts up securely, at least the first time, by using the secure bootstrap method described in U.S. Pat. No. 10,277,616. In some embodiments, secure translator (12) is "air-gapped," that is, not networked directly or indirectly with any (or at least a particular) network, such as the Internet. When some embodiments of secure translator (12) are initially deployed, secure translator (12) is preprogrammed with configuration data (13) describing one are more insecure devices (20) that might be encountered. For example, if a secure translator (12) is intended for deployment to protect an insecure device (20) that, at its initial installation, presents itself as a wireless network access point by broadcasting an SSID having a particular configuration. (For example, the SSID might always take the form "InsecDev_xxxxx," where "xxxxx" is a five-digit number.) This information would be made available to secure translator (12) as part of configuration data (13), so when secure translator (12) is deployed, it will monitor wireless broadcasts for advertising of new access points. When one is detected that meets the configuration parameters described in configuration data (13), secure translator (12) uses additional information in configuration data (13) to connect to insecure device (20) as securely as possible. In some implementations, secure translator (12) might reconfigure and/or update insecure device (20) to optimize its security posture and limit the likelihood that insecure device (20) will be subjected to a denial of service or otherwise affected by other devices.

Once secure translator (12) has established a connection with insecure device (20), secure translator (12) functions as a proxy, switch, router, or other intermediary for access by insecure device (20) to network communications. In that role, secure translator (12) can capture, parse, analyze, and, if necessary or desirable, manipulate any or all of the inbound and outbound communication with respect to insecure device (20) in furtherance of the security requirements of the environment and/or in accordance with industry standards.

Schematically, inbound communication traffic from requesting device (14) such as TCP/IP packets are received by a first module (22) of secure translator (12), manipulated, and then passed on to be received by insecure device (20). The manipulation of inbound communication packets by first module (22) may include screening or scrubbing information or data from the data packet header or the payload data, or "informational content" of the communication, itself. Secure translator (12) may also analyze traffic patterns or other metrics to identify an attack or security threat and modify the communication in response, including in some embodiments dropping the communication and/or dropping the connection to the requesting device (14). That is, secure translator (12) chooses from among variants of outgoing messages as a function of the comparison of the communication with known traffic patterns or other metrics. The data within some or all of the seven layers of the standard OSI telecommunication model may be manipulated or scrubbed to convert or sanitize the inbound communication as desired and remove threats presented by the data to be passed along to insecure device (20). Changes may be made to the communication protocol, encryption level and/or type, or any other aspect of the communication as will occur to those skilled in the art in view of this disclosure, and the result of the changes is sent by secure translator (12) to insecure device (20).

Outbound communication traffic from insecure device (20) is received by a second module (24) of secure translator (12), manipulated, and then passed on to be received by requesting device (14). This manipulation of outbound communication packets by second module (24) may incorporate any or all of the types of manipulation that may be done by first module (22), wherein any one or all of the seven layers of the OSI telecommunication model may be investigated, scrubbed, and/or updated with new data in furtherance of the security requirements of the environment and/or in accordance with industry standards. In addition to the packet header, the underlying data, or informational content of the communication, itself may be manipulated to prevent security issues, while still allowing insecure device (20) to communicate with other devices through the secure translator (12). Again, the communication protocol, encryption level and/or type, or other aspect of the communication from the insecure device (20) is adapted, and the communication is transmitted to requesting device (14).

Figure 4:
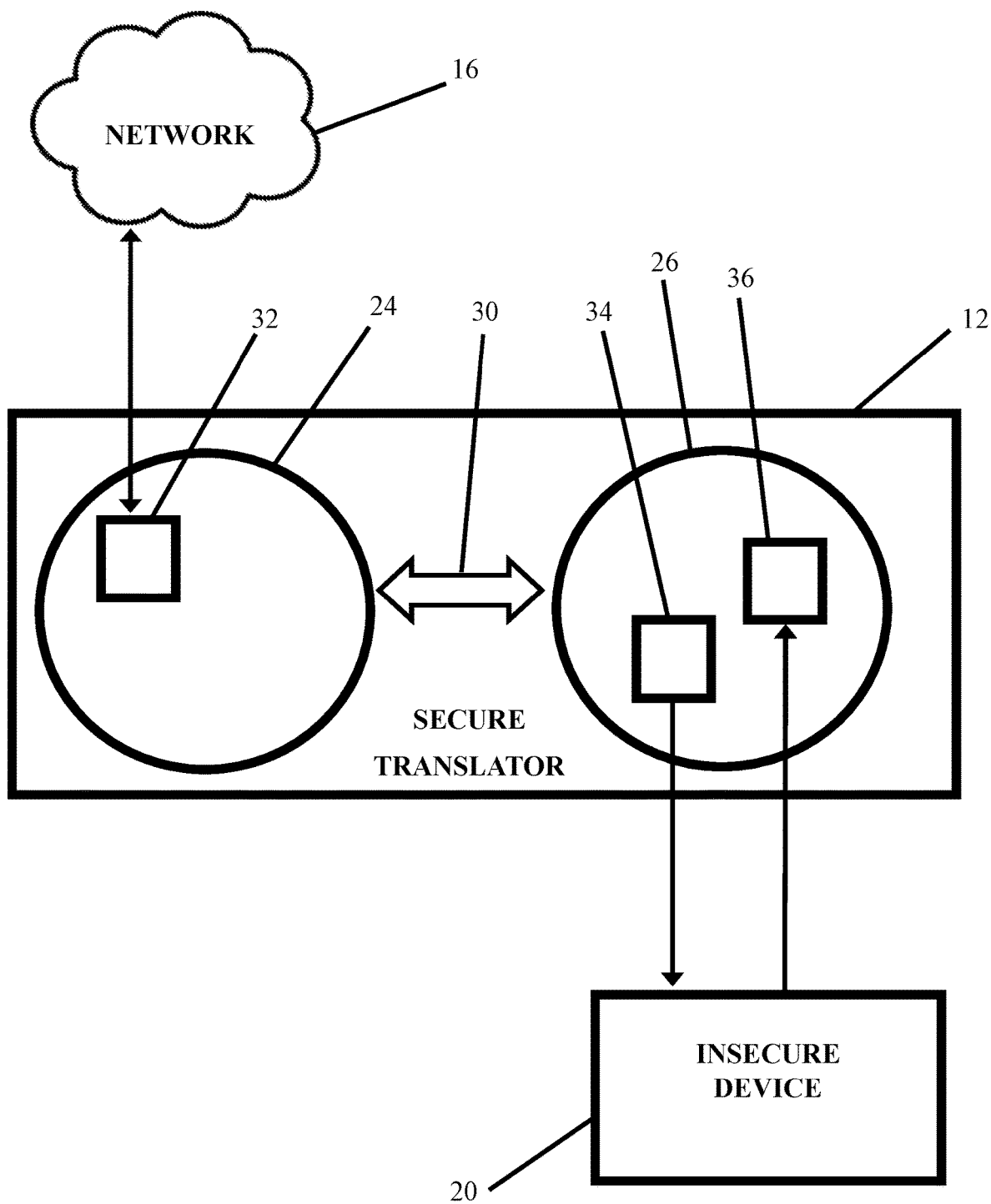
FIG. 4 depicts another schematic diagram of the secure translator of FIG. 1 communicating with an exemplary network and the insecure device.

With respect to the software implementation of portions of secure translator (12), as shown in FIG. 4, some or all of the software or internal logic of secure translator (12) may utilize an object-oriented approach or an encapsulated container-style object architecture such as "docker," "rkt," or "podman" software. In some versions of secure translator (12), two container objects are instantiated in isolated portions of memory using microservices for inter-object communication therebetween. More specifically, a first container object (24) and a second container object (26) are instantiated within secure translator (12), and one or more channels (30) are instantiated for inter-object communication therebetween.

Secure translator (12) generally tasks first container object (24) with secure outside communications. First container object (24) includes a first communications interface such as virtual network interface card (NIC) (32) for bidirectional communication between network (16) and first container object (24). First container object (24) communicates as needed with requesting device (14) and/or network (16) through first virtual NIC (32). Further, as will be described in greater detail below, first container object (24) obtains a configuration file or instructions from configuration server (18) via first virtual NIC (32) and actuates the configuration of secure translator (12).

Second container object (26) is generally tasked with the secure management of communications with insecure device (20). Second container object (26) receives inbound communications from and transmits outbound communications to first container object (24) over channel (30). Second container object (26) does not have direct access to first virtual NIC (32) or any other channels for communication to or through network (16). Upstream communication, meaning communication inbound from network (16) or requesting device (14) or outbound to network (16) or requesting device (14), must pass from second container object (26) through channel (30) and first container object (24) for enhanced security and partitioning of communications with insecure device (20).

For added security and partitioning of communications, second container object (26) includes a second virtual communications interface such as second virtual NIC (34) and a third virtual communications interface such as third virtual NIC (36). Second virtual NIC (34) is configured to second container object (26) to insecure device (20) and is preferably incapable of receiving communication from insecure device (20) or any other communications. Third virtual NIC (36) is configured to provide unidirectional communication from second container object (26) to insecure device (20) and is preferably incapable of sending communication to insecure device (20) or any other recipient. In this way, the communication between second container object (26) and insecure device (20) is separated and sequestered based on which direction the communication is flowing for added security. Of course, in other embodiments, communications described here as occurring through second virtual NIC (34) and third virtual NIC (36) are combined into a single communications interface using a bidirectional channel to communicate with insecure device (20).

In operation, a data communication such as a TCP/IP data packet will travel from network (16) to first virtual NIC (32) of first container object (26). In some versions of secure translator (12), information stored in the data packet header, the data packet itself, or both may be manipulated by first container object (26) and thereafter passed along to second container object (28) via channel (30). In other versions, the data packet is passed without manipulation through channel (30) to second container object (28). Once the data packet is received by second container object (28), the information stored in the data packet header, the data packet itself, or both may be manipulated by second container object (28).

Thereafter, the (possibly manipulated) data is passed to insecure device (20) by way of second virtual NIC (34), the unidirectional communication pathway from second container object (28) to insecure device (20). Insecure device (20) attends to the data accordingly and passes response data to second container object (28) by way of third virtual NIC (36), the unidirectional communication pathway flowing from insecure device (20) to second container object (28). Second container object (28) thereafter parses the data, manipulates the data if needed, and passes the manipulated data along channel (30) to first container object (26). In some versions of secure translator (12), first container object (26) manipulates the data in addition to or rather than second container object (28). Thereafter, the updated data is passed to network (16) by way of first virtual NIC (32) to complete the communication from network (16) to insecure device (20).

In those situations where insecure device (20) initiates communication with a device, for example, requesting device (14), connected through network (16), it will be readily apparent to those skilled in the art that the round-trip communication route begins with insecure device (20) passing a data packet to second container object (28) via third virtual NIC (36). Second container object (28) filters and/or manipulates the data as needed and communicates it to first container object (24) through channel (30). First container object (24) filters and/or manipulates the data as needed, then communicates the filtered/manipulated data through first virtual NIC (32) and network (16) to requesting device (14). Requesting device (14) sends a response back through network (16) and first virtual NIC (32) to first container object (24), which processes the response and conveys the processed response through channel (30) to second container object (26). Second container object (26) further filters and/or manipulates the data, then sends it through second virtual NIC (34) to insecure device (20).

First container object (24) and/or second container object (26) of secure translator (12) may incorporate some or all of the system bootstrap and health methodologies described in U.S. application Ser. Nos. 14/866,834, 15/861,150, and 15/861,175, which are incorporated entirely herein by reference. For example, secure translator (12) may include an analysis engine that records a full packet capture of the data transmitted between requesting device (14) and insecure device (20). This captured data may then be compared to the traffic patterns and associated heuristics of known attacks, expected traffic, and particular risks associated with the given insecure device (20), and/or attacks, expected traffic, and particular risks known in the industry to be associated with insecure device (20). If a troublesome traffic pattern or threat is detected, secure translator (12) is configured to neutralize the threat, including changing or blocking some or all of the communication to and from insecure device (20).

IV. Configuring Secure Translator

When installing or introducing secure translator (12) into a network, secure translator (12) is generally network-connected and may communicate with any number of different computing devices or networks as needed. In contrast, insecure device (20) is preferably directly connected to secure translator (12) via a dedicated connection such as serial, ethernet, or other style of direct communication link and can only communicate with other computing devices indirectly through secure translator (12) acting as a security proxy.

During initial bootup, secure translator (12) may be preprogrammed with parameters for one or both of its interfaces, namely, the outwardly facing interface to network (16) (which may be first virtual NIC (24)) and/or the inwardly facing interface to insecure device (20) (which may be the combination of second virtual NIC (34) and third virtual NIC (36)). With respect to the outwardly facing interface to network (16), secure translator (12) may be preprogrammed to reach out to a particular remote endpoint to download a configuration file or otherwise register or communicate with a server for initialization purposes. For example, in the situation illustrated in FIG. 1, secure translator (12) may be programmed to contact configuration server (18) upon bootup to download a configuration file for configuring secure translator (12). In another example, upon bootup of secure translator (12), insecure device (20) may be polled or a data stream from insecure device (20) may be captured and passed to configuration server (18) to determine the particular type, make, model, operating system, and other features and properties of insecure device (20) for use in communicating and securing insecure device (20). In another example, secure translator (12) may be preprogrammed to auto-sense network configurations, connections, and protocols and initialize itself upon bootup.

Some versions of secure translator (12) may be remotely configurable and/or use remotely verified bootup processes. For example, secure translator (12) may incorporate some or all of the remote configuration methodologies described in U.S. application Ser. Nos. 14/866,834, 15/861,150, and 15/861,175. In another example, upon bootup, secure translator (12) is configured to contact configuration server (18), and configuration server (18) is configured to remotely configure secure translator (12) in response to the contact from secure translator (12) as a function of information available locally to secure translator (12) and/or to configuration server (18). The remote configuration process may take the form of automatic remote configuration or manual remote configuration by an administrator.

One of the initialization operations for secure translator (12) in this illustrated embodiment is the capture of the IP address of insecure device (20), which is thereafter assumed and utilized by secure translator (12) to stand in place of insecure device (20) on the network and act as a proxy for communication to insecure device (20). Thus, routing tables and other network topology considerations do not need to be changed or updated when secure translator (12) is introduced into the network. In other implementations, secure translator (12) assigns an IP address to insecure device (20) (for example, by operating as a DHCP server) and maintains a subnet solely between secure translator (12) and insecure device (20) or among secure translator (12) and a plurality of insecure devices (20).

The term "computer-readable medium" herein encompasses non-transitory distribution media, intermediate storage media, execution memory of a computer, and any other medium or device capable of storing a computer program implementing a method for later reading by a computer.

When an act is described herein as occurring "as a function of" or "based on" a particular thing, the system is configured so that the act is performed in different ways depending on one or more characteristics of the thing.

While the embodiments described above refer to hashes of files, configuration data, and other data, some embodiments replace each such instance with different kinds of characterization information that characterizes the data as will occur to those skilled in the art. For example, the characterization information might only include or be based on specific portions of a file, an encoding of certain configuration settings, or processed portions of user profiles, among other options that will occur to those skilled in the art in view of this disclosure.

The various communications referred to herein may generally be sent and received synchronously or asynchronously, using one- or two-way channels. Some embodiments will use the TCP/IP protocols, while others will use USB or UDP over IP, and still others will use different techniques as will occur to those skilled in the art in view of this disclosure.

All publications, prior applications, and other documents cited herein are hereby incorporated by reference in their entirety as if each had been individually incorporated by reference and fully set forth. While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

V. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of or related to this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventor(s) or by a successor in interest to the inventor(s). If any claims are presented in this application or in subsequent filings related to this application that include additional features beyond those referred to below, those additional features shall not be presumed to have been added for any reason relating to patentability.

Example 1 is a method of securing an insecure device, comprising the steps of connecting a secure translator to an insecure device via a direct communication pathway that uses a first security protocol; and, all by the secure translator: receiving a first communication message from a requesting device via a network communication pathway that uses a second security protocol; converting the first communication message into a second communication message; sending the second communication message from the secure translator to the insecure device through the direct communication pathway using the first security protocol; receiving a third communication message from the insecure device through the direct communication pathway using the first security protocol; converting the third communication message into a fourth communication message; and sending the fourth communication message to the requesting device via the network communication pathway using the second security protocol.

Example 2 is a variation of Example 1, wherein the converting step comprises the secure translator comparing the first communication message to a known communication traffic pattern, thereby producing a result; and as a function of the result of the comparison, choosing either a first variant of the second communication message or a second variant of the second communication message.

Example 3 is a variation of Example 1, wherein the first communication message comprises payload data, and the conversion of the first communication message to a second communication message comprises manipulating the payload data.

Example 4 is a variation of Example 1, wherein at least one of the first program object and the second program object changes the first informational content into the second informational content as a function of at least one of traffic patterns, traffic metrics, compliance with a predetermined industry standard, and a predetermined policy.

Example 5 is a variation of Example 1, wherein the second communication message travels through a first unidirectional communication interface; and the third communication message travels through a second unidirectional communication interface.

Example 6 is a method of securing an insecure device, comprising the steps of instantiating a first program object, a second program object, and a channel therebetween on a secure translator; instantiating a first communications interface on the secure translator, wherein the first communications interface is bidirectional, and the first communications interface is associated with the first program object; instantiating a second communications interface on the secure translator, wherein the second communications interface is unidirectional, the second communications interface is associated with the second program object, and the second communications interface is configured to transmit data from the second program object to the insecure device; instantiating a third communications interface on the secure translator, wherein the third communications interface is unidirectional, the third communications interface is associated with the second program object, and the third communications interface is configured to receive data from the insecure device; receiving, via the first communications interface, a first communication message from a requesting device, where the first communication message comprises first informational content; transmitting, via the channel, a second communication message from the first program object to the second program object, where the second communication message is derived from the first communication message; transmitting, via the second communications interface, a third communication message from the second program object to the insecure device, where the third communication message is derived from the second communication message, and where the third communication message comprises second informational content; and receiving, by the second program object and via the third communications interface, a fourth communication message from the insecure device; wherein the first informational content is different from the second informational content.

Example 7 is a variation of Example 6, further comprising transmitting, via the channel, a fifth communication message from the second program object to the first program object, where the fifth communication is derived from the fourth communication message; and transmitting, via the first communications interface, a sixth communication message from the first program object to the requesting device; wherein the fourth communication message comprises third informational content, the sixth communication message comprises fourth informational content, and the third informational content in the fourth informational content are different.

Example 8 is a variation of Example 6, wherein the first communications interface is a virtual network interface card (NIC), and the second communications interface is a virtual NIC.

Example 9 is a variation of Example 6, wherein at least one of the first program object and the second program object changes the first informational content into the second informational content as a function of at least one of traffic patterns, traffic metrics, compliance with a predetermined industry standard, and a predetermined policy.

Example 10 is a secure translator for securing communications of a target device, comprising a computing device having a processor and a memory, the memory being encoded with programming instructions executable by the processor to: establish a direct communication pathway between the computing device and a target device, the direct communication pathway using a first security protocol; receive a first communication message from a requesting device via a network communication pathway that uses a second security protocol; convert the first communication message into a second communication message; send the second communication message to the target device through the direct communication pathway using the first security protocol; receive a third communication message from the target device through the direct communication pathway using the first security protocol; convert the third communication message into a fourth communication message; and send the fourth communication message to the requesting device via the network communication pathway using the second security protocol.

Example 11 is a variation of the Example 10, wherein: the first, second, third, and fourth communication messages each have payload data; the payload data of the first communication message is different from the payload data of the second communication message; and the payload data of the third communication message is different from the payload data of the fourth communication message.

Example 12 is a variation of Example 10 wherein: the direct communication pathway comprises a first unidirectional pathway from the secure translator to the target device and a second unidirectional pathway from the target device to the secure translator; the programming instructions are further executable by the processor to: instantiate a first program object in a first portion of the memory; associate the first program object with the first unidirectional pathway; instantiate a second program object in a second portion of the memory that is isolated from the first portion of the memory; associate the second program object with the second unidirectional pathway; and send the second communication message through the first unidirectional pathway and to receive the third communication message through the second unidirectional pathway.

Example 13 is a variation of Example 12, wherein at least one of the first program object and the second program object determines the second communication message from the first communication message as a function of a security analysis of the first communication message, wherein the derivation comprises modifying the payload of first communication message to determine the payload of the second communication message.

Example 14 is a variation of Example 13, wherein the security analysis comprises analysis of the traffic pattern encountered by the secure translator.

Example 15 is a variation of Example 13, wherein the security analysis comprises a determination whether traffic received from the target device complies with a predetermined industry standard.

Example 16 is a variation of Example 13, wherein the security analysis comprises a determination whether traffic received from the requesting device complies with a predetermined industry standard.

Example 17 is a secure translator for securing communications of a target device, comprising a computing device having a processor and a memory, the memory being encoded with programming instructions executable by the processor to: instantiate a first program object, a second program object, and a channel therebetween; associate the first program object with a first communications interface; associate the second program object with a second communications interface; wherein the first program object is configured to communicate with a network through a first communications interface using a first security protocol; wherein the second program object is configured to communicate directly with a target device through a second communications interface using a second security protocol, the second security protocol being different from the first security protocol; and wherein the first program object and the second program object are each further configured to relay messages between their respective communications interface and the channel, modifying the payload as a function of at least one of traffic patterns, traffic metrics, compliance with a predetermined industry standard, and a predetermined policy.

Example 18 is a variation of Example 17, wherein: the second communications interface comprises a unidirectional outbound channel and a unidirectional inbound channel, and the second program object comprises a first program sub-object associated with the unidirectional outbound channel and a second program sub-object associated with the unidirectional inbound channel.

Example 19 is a variation of Example 18, wherein: the first communications interface is a first virtual network interface card (NIC), the unidirectional inbound channel uses a second virtual NIC of the secure translator, and the unidirectional outbound channel uses a third virtual NIC of the secure translator.

Example 20 is a variation of Example 17, wherein the first program object and the second program object both modify the payloads of messages being relayed.

Example 21 is a variation of Example 17, wherein the instantiation of the first program object and the second program object is performed as a function of configuration information received from a remote configuration server.

V. Miscellaneous

It should be understood that any of the examples described herein may include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with the definitions, statements, or other material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various versions of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A method of securing an insecure device, comprising the steps of:
    (a) connecting a secure translator to an insecure device via a direct communication pathway that uses a communication protocol;
    (b) receiving, by the secure translator, a first communication message comprising content from a requesting device via a network communication pathway that uses a first security protocol;
    (c) analyzing, by the secure translator, the content of the first communication message to produce a result;
    (d) as a function of the result of the analyzing step (c), manipulating, at the secure translator, the content of the first communication message;
    (e) sending, from the secure translator, a second communication message to the insecure device through the direct communication pathway using the communication protocol, wherein the content of the second communication message is the manipulated content of step (d);
    (f) receiving, by the secure translator, a third communication message from the insecure device through the direct communication pathway using the communication protocol, the third communication message comprising content;
    (g) analyzing, by the secure translator, the content of the third communication message to produce a result;
    (h) as a function of the result of the analyzing step (g), manipulating, at the secure translator, the content of the third communication message; and
    (i) sending, by the secure translator, a fourth communication message to the requesting device via the network communication pathway using the first security protocol, wherein the content of the fourth communication message is the manipulated content of step (h).

2. The method of claim 1, wherein manipulating step (d) comprises the secure translator:
    (d1) comparing the first communication message to a known communication traffic pattern, thereby producing a result; and
    (d2) as a function of the result of the comparison, choosing either a first variant of the second communication message or a second variant of the second communication message.

3. The method of claim 1, wherein:
    the content of the first communication message comprises payload data; and
    the manipulation of the content of the first communication message comprises manipulating the payload data.

4. The method of claim 1, wherein:
    the content of the first communication message comprises data packet header data; and
    the manipulation of the first communication message comprises manipulating the data packet header data.

5. The method of claim 1, wherein at least one of a first program object and a second program object performs the analysis of the content of the first communication message as a function of one or more factors selected from the group consisting of traffic patterns, traffic metrics, compliance with a predetermined industry standard, and a predetermined policy.

6. The method of claim 1, wherein:
    the second communication message travels through a first unidirectional communication interface of the secure translator; and
    the third communication message travels through a second unidirectional communication interface of the secure translator.

7. A method of securing an insecure device, comprising the steps of:

(a) instantiating a first program object, a second program object, and a channel therebetween on a secure translator;

(b) instantiating a first communications interface on the secure translator, wherein the first communications interface is bidirectional, and the first communications interface is associated with the first program object;

(c) instantiating a second communications interface on the secure translator, wherein the second communications interface is unidirectional, the second communications interface is associated with the second program object, and the second communications interface is configured to transmit data from the second program object to the insecure device;

(d) instantiating a third communications interface on the secure translator, wherein the third communications interface is unidirectional, the third communications interface is associated with the second program object, and the third communications interface is configured to receive data from the insecure device;

(e) receiving, via the first communications interface, a first communication message comprising content from a requesting device;

(f) analyzing the content of the first communication message to produce a result;

(g) as a function of the result of the analyzing step (f), manipulating the content of the first communication message;

(h) transmitting, via the channel, a second communication message comprising content from the first program object to the second program object, where the content of second communication message is the manipulated content of step (g);

(i) transmitting, via the second communications interface, a third communication message comprising content from the second program object to the insecure device, where the third communication message is derived from the second communication message; and (j) receiving, by the second program object and via the third communications interface, a fourth communication message comprising content from the insecure device.

8. The method of claim 7, wherein:
the first communications interface is a first virtual network interface card (NIC);
the second communications interface is a second virtual NIC; and
the third communications interface is a third virtual NIC.

9. The method of claim 7, wherein at least one of the first program object and the second program object performs the analyzing step (f), and wherein the analyzing step (f) is based on at least one of traffic patterns, traffic metrics, compliance with a predetermined industry standard, and a predetermined policy.

10. The secure translator of claim 7, wherein the second program object comprises a first program sub-object associated with the second communications interface and a second program sub-object associated with the third communications interface.

11. The secure translator of claim 7, wherein the instantiation of the first program object and the second program object is performed as a function of configuration information received from a remote configuration server.

12. The method of claim 7, further comprising:
(k) analyzing the content of the fourth communication message to produce a result;

(l) as a function of the result of the analyzing step (k), manipulating the content of the fourth communication message;

(m) transmitting, via the channel, a fifth communication message comprising content from the second program object to the first program object, where the content of the fifth communication is the manipulated content of step (l); and (n) transmitting, via the first communications interface, a sixth communication message comprising content from the first program object to the requesting device, where the sixth communication message is derived from the fifth communication message.

13. The secure translator of claim 12, wherein the content of each of the first, second, third, fourth, fifth, and sixth communication messages each comprises payload data; and wherein at least one of the first program object and the second program object modify at least one of the payload data.

14. A secure translator for securing communications of a target device, comprising a computing device having a processor and a memory, the memory being encoded with programming instructions executable by the processor to:
(a) establish a direct communication pathway that uses a communication protocol, the direct communication pathway comprising a first unidirectional pathway from the computing device to the target device and a second unidirectional pathway from the target device to the computing device, wherein each of the first unidirectional pathway and the second unidirectional pathway use the communication protocol;

(b) receive a first communication message comprising content from a requesting device via a network communication pathway that uses a first security protocol;

(c) analyze the content of the first communication message to produce a result;

(d) as a function of the result of the analyze step (c), manipulate the content of the first communication message;

(e) send a second communication message comprising content to the target device through the first unidirectional pathway using the communication protocol, wherein the content of the second communication message is the manipulated content of step (d);

(f) receive a third communication message comprising content from the target device through the second unidirectional pathway using the communication protocol;

(g) analyze the content of the third communication message to produce a result;

(h) as a function of the result of the analyze step (g), manipulate the content of the third communication message; and (i) send a fourth communication message comprising content to the requesting device via the network communication pathway using the first security protocol, wherein the content of the fourth communication message is the manipulated content of step (h).

15. The secure translator of claim 14, wherein:
the content of each of the first, second, third, and fourth communication messages each comprises payload data;
the payload data of the first communication message is different from the payload data of the second communication message; and
the payload data of the third communication message is different from the payload data of the fourth communication message.

16. The secure translator of claim 14, wherein the programming instructions are further executable by the processor to:
- (j) instantiate a first program object in a first portion of the memory;
- (k) associate the first program object with the first unidirectional pathway;
- (l) instantiate a second program object in a second portion of the memory that is isolated from the first portion of the memory;
- (m) associate the second program object with the second unidirectional pathway;
- (n) send the second communication message through the first unidirectional pathway; and
- (o) receive the third communication message through the second unidirectional pathway.

17. The secure translator of claim 16, wherein at least one of the first program object and the second program object determines the second communication message as a function of a security analysis of the first communication message.

18. The secure translator of claim 17, wherein the security analysis comprises analysis of traffic patterns encountered by the computing device.

19. The secure translator of claim 17, wherein the security analysis comprises a determination of whether traffic received from the target device complies with a predetermined industry standard.

20. The secure translator of claim 17, wherein the security analysis comprises a determination of whether traffic received from the requesting device complies with a predetermined industry standard.

* * * * *